(12) United States Patent
Nelke et al.

(10) Patent No.: US 8,719,271 B2
(45) Date of Patent: May 6, 2014

(54) ACCELERATING DATA PROFILING PROCESS

(71) Applicant: International Business Machines Corporation, Armonk, NY (US)

(72) Inventors: Sebastian Nelke, Schoenaich (DE); Martin Oberhofer, Bondorf (DE); Yannick Saillet, Stuttgart (DE); Jens Seifert, Gaertringen (DE)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 13/645,730

(22) Filed: Oct. 5, 2012

(65) Prior Publication Data

US 2013/0091094 A1  Apr. 11, 2013

(30) Foreign Application Priority Data

Oct. 6, 2011 (EP) .................................. 11184173

(51) Int. Cl.
*G06F 17/30* (2006.01)
(52) U.S. Cl.
USPC ........................... 707/737; 707/636; 709/201
(58) Field of Classification Search
USPC ........................... 707/736, 737, 636; 709/201
See application file for complete search history.

(56) References Cited

U.S. PATENT DOCUMENTS

| | | | |
|---|---|---|---|
| 6,636,861 B1 | 10/2003 | Stack | |
| 7,428,524 B2 * | 9/2008 | Burrows et al. | 1/1 |
| 7,548,928 B1 * | 6/2009 | Dean et al. | 1/1 |
| 7,631,034 B1 * | 12/2009 | Haustein et al. | 709/201 |
| 7,720,883 B2 | 5/2010 | Chen et al. | |
| 7,865,509 B2 | 1/2011 | Barsness et al. | |
| 7,865,575 B2 * | 1/2011 | Leitheiser | 709/219 |
| 2005/0114369 A1 | 5/2005 | Gould et al. | |
| 2007/0074155 A1 | 3/2007 | Ama et al. | |
| 2007/0074176 A1 | 3/2007 | Cao et al. | |
| 2010/0250563 A1 | 9/2010 | Cao et al. | |
| 2011/0246816 A1 * | 10/2011 | Hsieh et al. | 714/4.12 |
| 2013/0246342 A1 * | 9/2013 | Faith et al. | 707/607 |
| 2013/0254196 A1 * | 9/2013 | Babu et al. | 707/736 |
| 2013/0282668 A1 * | 10/2013 | Hsieh | 707/691 |
| 2013/0290957 A1 * | 10/2013 | Li et al. | 718/1 |

OTHER PUBLICATIONS

David Loshin, "New Paradigms for High Performance Analytical Computing", Vertica Systems Knowledge Integrity, Inc. White Paper, Oct. 2009, pp. 1-15.

Merv Adrian et al., "Analytic Platforms: Beyond the Traditional Data Warehouse", Beyenetwork Custom Research Report Prepared for Teradata, 2010, TechTarget, BI Research, IT Market Strategy, pp. 1-33.

* cited by examiner

*Primary Examiner* — Debbie Le
(74) *Attorney, Agent, or Firm* — Law Office of Jim Boice

(57) ABSTRACT

A data profile request is handles by utilizing data in a distributed file system. Tabular data is extracted from a data source and stored in a distributed file system. Each table in the tabular data is split by columns, which are each stored in separate files in a set of physical nodes of the distributed file system. In response to a data profiling request, a master node determines, based on the profiling request, which groups of files are needed to be on a same physical node in order to perform the profiling analysis. The master node creates jobs using physical nodes that contain the requisite files needed for each job.

20 Claims, 5 Drawing Sheets

Absolute number of common values between the columns    401

|    | C2 | C3 | C4 | C5 |
|----|----|----|----|----|
| C1 | 4  | 7  | 4  | 5  |
| C2 |    | 5  | 2  | 5  |
| C3 |    |    | 3  | 7  |
| C4 |    |    |    | 3  |

% of common values between the columns    402

|    | C1   | C2  | C3   | C4  | C5   |
|----|------|-----|------|-----|------|
| C1 | -    | 40% | 70%  | 40% | 50%  |
| C2 | 80%  | -   | 100% | 40% | 100% |
| C3 | 70%  | 50% | -    | 30% | 70%  |
| C4 | 100% | 50% |      | -   | 75%  |
| C5 | 71%  | 71% | 100% | 43% | -    |

FIG. 4

ACCELERATING DATA PROFILING PROCESS

The present invention relates to the field of data processing, and more particularly to a method and system for accelerating the data profiling process.

BACKGROUND

Data profiling is the process involving an initial analysis of existing data on multiple source systems. The data are extracted from the source systems using ETL (extract, transform, and load) processes. Such data are usually presented in a table format. Data profiling analyzes the data to retrieve information for each analyzed columns, such as their inferred types, general statistics about the values it contains, common formats, value distributions, etc. With this information, the user can define the valid range of values for each column and measure the number of records which are outside this valid range. Data profiling can also include a cross-domain analysis function examining content and relationships across tables to identify overlaps in values between columns and any redundancy of data within or between tables. The cross-domain analysis can be used to identify primary/foreign key (PK/FK) relationships between tables. In addition, such a process can include a monitoring of the data quality, which is done by regularly evaluating a defined set of metrics on rules on the data.

The data profiling process is computationally intense, and requires sufficiently powerful systems to accomplish the task within acceptable periods. Also, processing large volumes of data would be prohibitive for some analytical processes, like cross-domain analysis, and would constrain the user to limit the analysis to a small set of data to get that analysis completed in a reasonable time.

SUMMARY

In one embodiment, the present invention relates to a method for accelerating profiling data in a distributed file system. The method comprises the steps of:

extracting tabular data from a data source to the distributed file system, the tabular data being a matrix-like structure of columns and the rows containing data values, each row being uniquely identified by a row ID, splitting each table by columns, each column being stored in a separate file, storing the files on a set of physical nodes of the distributed file system, each file existing at least on the at least one or two different physical nodes, receiving a data profiling request from an application client, the data profiling request indicating a profiling analysis type and data files to be profiled, computing from the profiling request the groups of files to be needed on the same physical nodes in order to perform the profiling analysis, creating jobs by the master node, each job requiring a subset of the files being located in data profiling requests to analyze, searching for physical nodes holding the required files by each job using the information contained in the meta data repository on the placement of the files across the physical nodes, determining a selected physical node where the job being executed for one of the two following cases, and:

in case all the files required by the job are found in more than one physical node, selecting the physical node with minimal utilization, in case all files required by the job are not found on a single physical node, redistributing the required files to lodge in a single physical node, the single physical node being selected based on its utilization, executing the job in the selected physical node.

This embodiment is advantageous over the prior art, since the profiling analysis is running where the data are located, in the distributed file system. Therefore, there is no Input/Output (IO) bottleneck which would be caused by the data movements. Also, the system scales linearly with the number of physical nodes. It is easy to add/remove dynamically nodes to the distributed file system. Such file systems are designed to work with a very large number of nodes and are protected against node failure. Additional advantage being that the physical nodes can be heterogeneous both in term of hardware and of services provided. It is possible to use a large number of unused low-spec machines for the profiling tool.

According to another embodiment of the present invention, the format of each column is compressed by storing only the distinct data value of the column in sorted order. Each distinct data value is associated with a list of row IDs that match the distinct data value.

This embodiment is advantageous over the prior art, since different tests done on different columns will run on different physical nodes. Therefore, IO and resources competition between the processes is reduced. Also, each physical node can focus on a simpler operation computed on a simple column, instead of having several nodes computing the complete analysis on the subset of the rows.

According to another embodiment a self-destroy operation is executed automatically by the physical node on a file having reached a certain expiry date. This operation would ensure freeing of resources.

According to another embodiment all the jobs having a starting time during a predefined time window are accumulated for a global treatment by the master node. In contrast to the individual treatment, the global treatment of the jobs would require less resource consumption.

According to another embodiment when the physical node is holding other system jobs in addition to the profiling job, a measurement of the resource utilization by the physical node is performed. If the resource utilization exceeds a certain threshold, the files are dynamically replicated from the physical node to a new physical node. Next, the new physical node will be used to execute the profiling job. This embodiment may be advantageous, because the pain point caused by the coincidence of the profiling jobs and system jobs on the same physical node is removed.

According to another embodiment the distribution of the files is performed either by copying missing files to a physical node with maximum amount of the requested files or by moving all requested files with clone operation to physical node with minimal load. In addition, the memory is freed up as soon as the files being cloned exceed maximum amount of redundant files. This embodiment enables the tests that involve a single file to be independently evaluated by the single physical node containing the file.

According to another embodiment when all files required by a job are found on a single physical node with high utilization, another physical node with less utilization is selected. All the required files on the new physical node are duplicated.

This embodiment is advantageous over the prior art, since the execution of the jobs on the physical nodes with less utilization fasten the processing and add additional improvement to the scalability of the profiling process.

According to another embodiment the utilization of a physical node can be defined as the CPU/IO load or as the number of concurrent jobs using the files on the physical node.

In a further aspect, the invention relates to a computer-readable non-transitory storage medium comprising computer-readable instructions which, when executed by a processor, cause the processor to perform the method of anyone of the method steps of the embodiments described above.

In a further aspect, the invention relates to a computer system adapted for:

extracting tabular data from a data source to the distributed file system, the tabular data being a matrix-like structure of columns and the rows containing data values, each row being uniquely identified by a row ID, splitting each table by columns, each column being stored in a separate file, storing the files on a set of physical nodes of the distributed file system, each file existing at least on the at least one or two different physical nodes, receiving a data profiling request from an application client, the data profiling request indicating a profiling analysis type and data files to be profiled, computing from the profiling request the groups of files to be needed on the same physical nodes in order to perform the profiling analysis, creating jobs by the master node, each job requiring a subset of the files being located in data profiling requests to analyze, searching for physical nodes holding the required files by each job using the information contained in the meta data repository on the placement of the files across the physical nodes, determining a selected physical node where the job being executed for one of the two following cases, in case all the files required by the job are found in more than one physical node, selecting the physical node with minimal utilization, in case all files required by the job are not found on a single physical node, redistributing the required files to lodge in a single physical node, the single physical node being selected based on its utilization, executing the job in the selected physical node.

BRIEF DESCRIPTION OF THE SEVERAL VIEWS OF THE DRAWINGS

The above and other items, features and advantages of the invention will be better understood by reading the following more particular description of embodiments of the invention in conjunction with the figures wherein:

FIG. 4 shows an example of matrices for cross-domain analysis; and

DETAILED DESCRIPTION

Embodiments of the present invention include a method for accelerating profiling data in a distributed file system. The data are structured in a new compressed format and stored on different files. The files are distributed in a redundant fashion across multiple physical nodes of the distributed file system. Moreover, the profiling analysis can be conducted in parallel on the physical nodes. A balance is also required between processing load and data availability.

A 'metadata repository' as used herein encompasses a database designed to support the storage, use and retrieval of metadata by a processor. Metadata may include, for example, information about how to access specific data, or more detail about data.

A 'data source' as used herein may be a relational database, spreadsheets, text files, XML files, mainframes, web servers, and metadata-rich abstract sources such as Customer Relationship Management (CRM), Enterprise Resource Planning (ERP), and Business Intelligence (BI) systems.

A 'distributed file system' as used herein is a system designed to hold very large amounts of data, and provide high-throughput access to this information. The distributed file system may include one or more computers or nodes, wherein a single node is designated the "master node" and the others are designated "physical" nodes. A few examples of file systems are: HDFS from Hadoop, GFS from Google, CloudStore, Amazon S3, GPFS from IBM, etc.

An 'ETL process' as used herein stands for extraction, transformation and loading. The process involves the extraction of data from the data source, the transformation of that data into a structure that is appropriate for analysis and loading the data into recipient tables.

A 'clone operation' as used herein stands for a replication of a data file to a requested physical node, without need to re-build a data dictionary for the data file.

Embodiments of the invention are described herein after by way of examples with reference to the accompanying figures and drawings.

Figure 1:
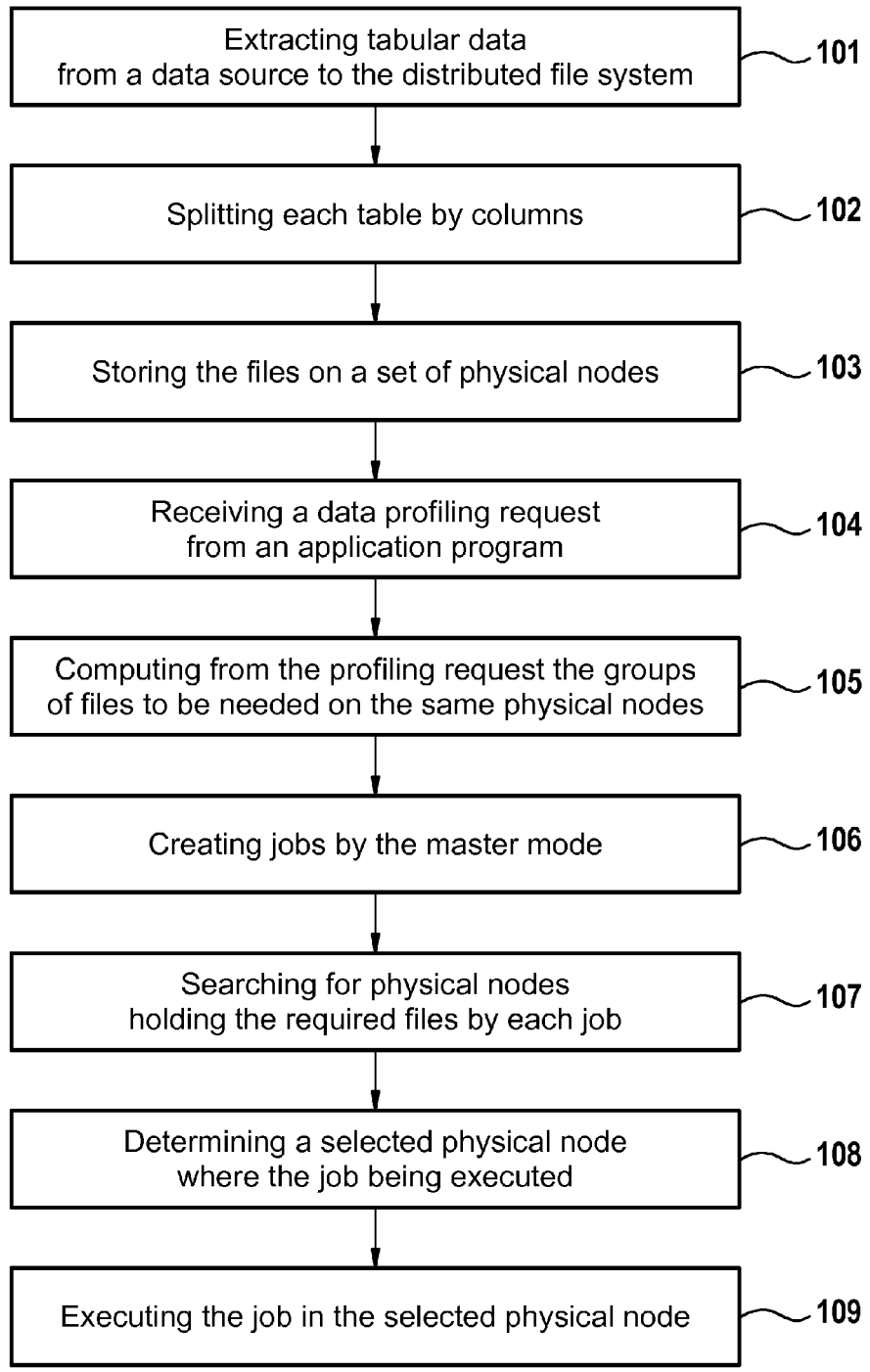
FIG. 1 is a flowchart of a method for accelerating profiling data in a distributed file system.

FIG. 1 is a flowchart of a method for accelerating profiling data in a distributed file system. In step 101, an ETL process is used to extract tabular data from the data source. During the transform phase, a series of functions are applied to the extracted tabular data to split the tables by columns in step 102, compress the data format of each column and store each column in a separate file. During the load phase, the transformed data are stored (step 103) on one or more physical node of the distributed file system. Each file is replicated at least once on two different physical nodes to ensure their durability to failure and high availability to parallel applications.

Once the transformed data are loaded into physical nodes of the distributed file system, users may access these data for various purposes, such as analyzing them for specific business needs.

In step 104, the master node receives from an application client a request for a data profiling analysis. The data profiling analysis indicates the profiling analysis type and the data files to be profiled. In step 105, the master node will compute the groups of files needed by the profiling analysis on the same physical nodes. In step 106, the master node will create jobs that will run on the computed groups of files. In step 107, the master node will search for the physical nodes holding the required files by each job using the files placement information contained in the metadata repository.

In some embodiments, a time window is defined. The master node searches the placement for all the jobs which must be started during this time window.

In step 108, the master node determines a selected physical node where the job is executed. In case all the files required by the job are found in more than one physical node, the physical node with minimal utilization is selected to hold the execution of the job. In one embodiment, the utilization of a physical node can be defined as the CPU/IO load or as the number of concurrent jobs using the files on the physical node. In another embodiment, when all files required by a job are found on a single physical node with high utilization, the files are duplicated on another physical node with less utilization.

In other case all the files required by the job are not found on a single physical node, the required files are redistributed to lodge in a single physical node. The single physical node is selected based on its utilization. In one embodiment, the distribution of the files is performed either by copying missing files to the physical node with the maximum amount of the requested files or by moving all requested files with clone operation to a physical node with minimal load. As soon as the files are cloned exceed a maximal amount of redundant files the memory is freed up.

In one embodiment, when the physical node is holding other system jobs in addition to the profiling job, a measurement of the resource utilization by the physical node is performed. If the utilization exceeds a certain threshold, the files are then dynamically replicated from the physical node to a new physical node, which will be used to execute the job.

In step 109, the master node pushes computation jobs to the nodes containing the files on which the jobs are executed.

Figure 2:
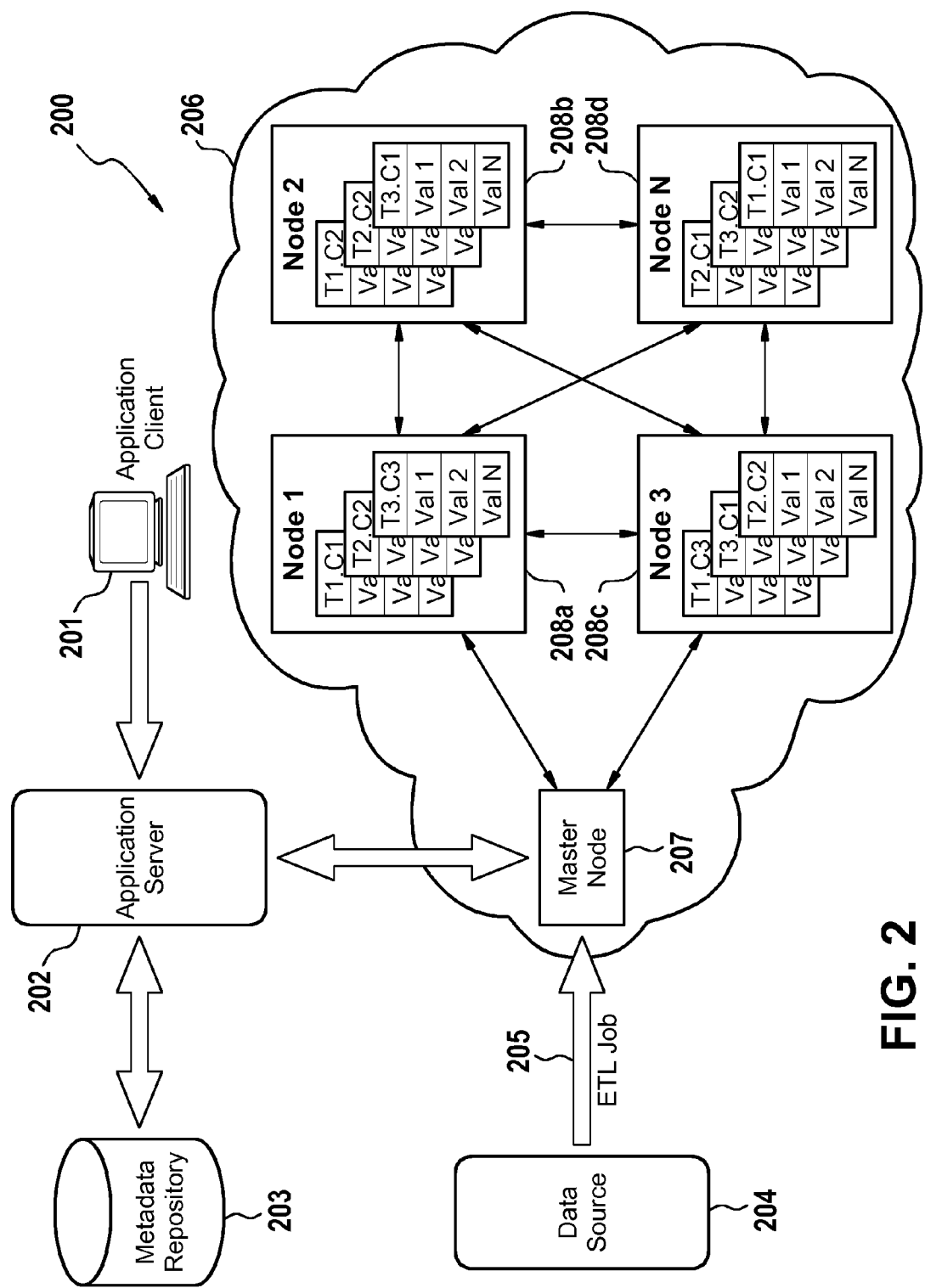
FIG. 2 shows a new architecture for data profiling applications.

FIG. 2 illustrates a simplified diagram of a hardware system 200 operable to execute the data profiling process in accordance with the disclosed architecture of the present invention. An ETL process 205 which, when executed by a processor, causes the processor to execute the extraction, transformation and loading of data from the data source 204. The data source 204 supplies a data set required for a specific analysis. The ETL process 205 loads transformed data into a cluster 206 which comprises two or more nodes. The nodes are interconnected via a network, such as internet and intranet. Generally, a node includes at least one processor, memory, and a network interface. Typically, one node operates as the "master" 207 for a particular application, where the master is responsible for executing the application. One or more other nodes within the cluster are "physical" nodes 208a-208d for that application, where each physical node 208 is available to take over the application from a failed master, if necessary. The physical nodes 208a-208d are administered by the master node 207. The client, after performing a conventional log-in using a client defined username and password, is operable to transmit requests from an application client 201 to an application server 202. The application client 201 and application server 202 are connected via a link (e.g. to the Internet). The master node 207 receives user requests through the server machine 202 and directs one or more physical nodes 208 to initiate and conduct the user requests. The master node 207 exchanges information about data with the metadata repository 203 through the application server 202. The metadata repository 203 is operatively coupled to the application server 202.

Figure 3:
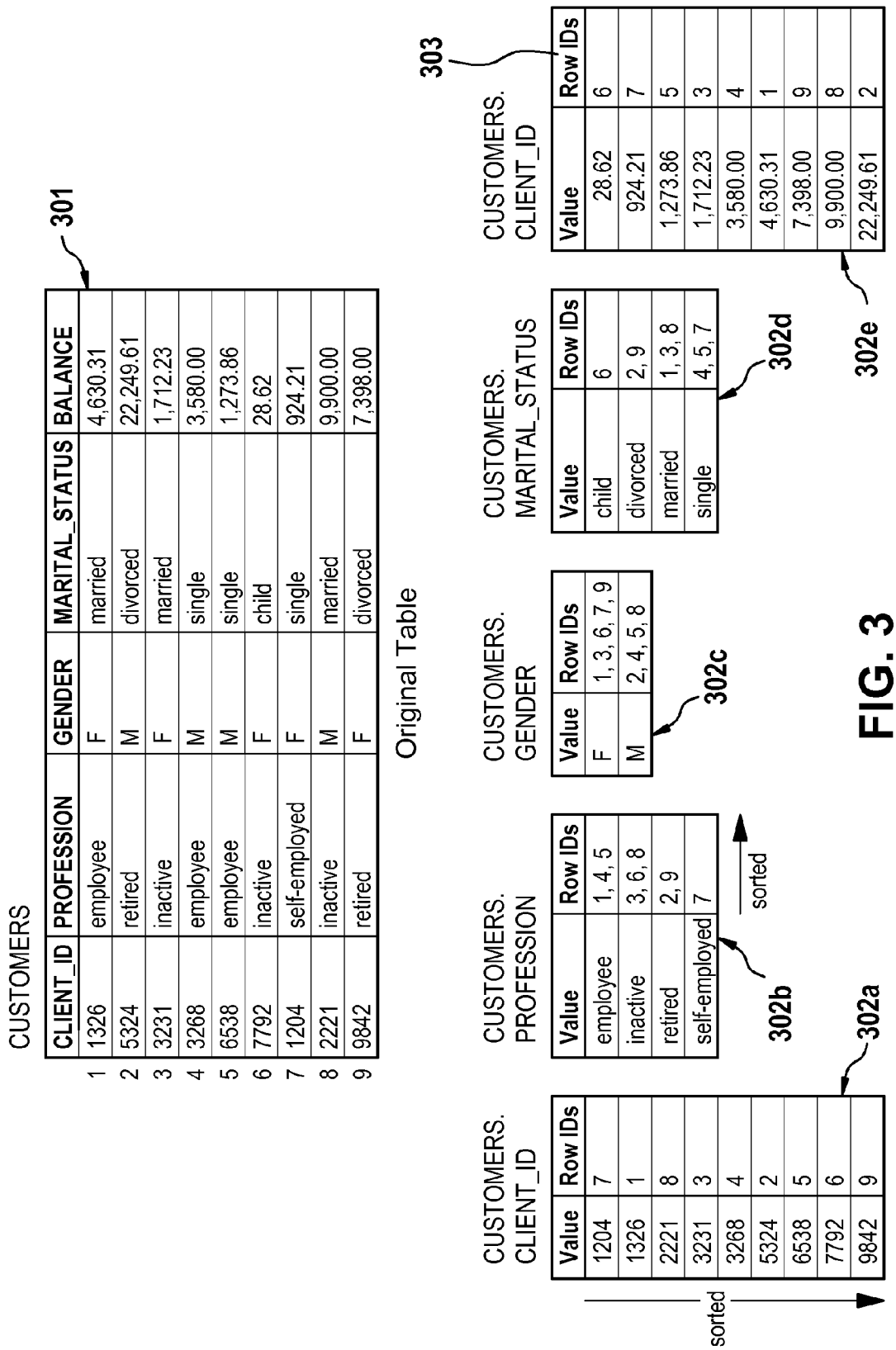
FIG. 3 shows a data format used to store the column on the distributed file system.

FIG. 3 shows a classical row-based table 301 having a matrix-like structure of columns and rows associated with certain data values such as, client ID, profession, gender, marital status, etc., and each row is uniquely identified by a row ID 303. The table is split by columns. In some embodiments, each column is compressed by storing only distinct data values of the column in a sorted order. Each distinct data value is associated with all row IDs that match the distinct data values. Each of the compressed columns 302a-302e is stored in a separate file, and each file is stored on different physical nodes 208 of the distributed file system 206.

Various analysis algorithms for the data profiling are designed to work in a row-based mode may be adapted to work in a column-based mode, Column Based Data Analysis During this analysis, each value of each column of each analyzed table is looked at in order to compute known statistic information about the columns in the profiling analysis. The frequency of each distinct value can be easily determined by just counting the number of row IDs associated with a particular value. This is due to the fact that the values are already stored in a format containing only the unique values and a list of row IDs for each value.

To compute the inferred types and format masks, the row-based algorithms can remain unchanged. However, instead of having to open each value of the column, the algorithms are only applied on each distinct value. In this case, the analysis becomes faster as it runs only on distinct values, in particular when the columns contain duplicated values. Other advantage being that only the data related to the column need to be loaded instead of the full rows in a traditional row-based data store.

In addition, some statistics like min/max can be computed without having to read all the values of the column, since the values are stored in a sorted format. This analysis will also benefit from the fact that each column is stored in a different physical node, because all columns of all tables need to be analyzed and each column is analyzed independently from the others.

Once the value and former distribution and general statistics are known, the data analyst can also define a valid range of each column. The valid range can be defined as a range of valid values or against a list of valid or invalid values or formats. When the range is defined, this analysis is run to compute the percentage of the rows which violate the range of the column. With the column-based data format, this analysis is very fast, as there is no need to evaluate each value in the column. For a range whose validity is defined by a min and max value, we only have to sum the frequencies for the distinct value stored before the mean value of the range and after the max value of the range, and for a range whose validity is defined by a list of valid/invalid values, we only have to retrieve the frequency of each invalid values and sum them up.

Cross-Domain Analysis and PK/FK Detection

This is one of the most expensive operations. These functions need to count for pairs of columns the number of values which are in both columns, or only in one or only in the other. During the cross-domain analysis, the profiling tool returns the percentage of common/non-common values to the user, while during PK/FK detection, the profiling tools use some heuristic based on the cross-domain analysis results to suggest good column pair candidates. A good PK/FK candidate is a pair of columns where the values are unique for the PK and all the values of the FK are in the PK.

Since the data are stored as described previously, a scalable algorithm which computes that kind of functional dependencies efficiently on a large number of columns can be used. For instance, a MapReduce approach is used to best use the parallelism of the distributed file system.

At the beginning of the analysis, an empty matrix containing the number of common values between each pair of columns is prepared. This matrix is symmetrical and initially filled with zeros. Each column to be evaluated is passed through a mapper with the following logic: for each distinct value of the columns, emit a key value pair with the column value as key and the name of the column as value. Since the columns are stored on different physical nodes, each mapper for each column will run on a different machine and do not compete for resources if the numbers of nodes is high enough. The result of all mappers is distributed to reducers which also all run on different physical nodes. Each reducer receives all key value pairs having the same key. For instance, if five columns T1.C1, T2.C3, T3.C2, T4.C4 and T5.C1 all contain the value 1, the reducer responsible for the value 1 will receive the following pairs <1, T1.C1>, <1, T2.C3>, <1, T3.C2>, <1, T4.C6>, <1, T5.C1>. Each reducer receives a value list of column IDs which all share the same particular value the reducer is responsible for. The logic of the reducer is then to increment by 1 the matrix for all different combinations of columns. In the previous example, the matrix would be incremented by 1 in the following cells: (T1.C1; T2.C3), (T1.C1; T3.C2), (T1.C1; T4.C6), (T1.C1; T5.C1), (T2.C3; T3.C2), (T2.C3; T4.C6), (T2.C3; T5.C1), (T3.C2; T4.C6), (T3.C2; T5.C1), (T4.C6; T5.C1). At the end when all values of all columns have been treated by their reducer the matrix contains all absolute numbers of common values between all pairs of columns. Illustrative example of such symmetrical matrices is shown on the matrix 401 of FIG. 4.

By dividing each cell in the matrix 401 of FIG. 4 by the number of distinct values of each column, a non-symmetrical matrix 402 containing the percentage of values shared by each pair is obtained. From this matrix, all the PK/FK candidates can easily be found. A foreign key candidate is a column with a percentage of common values with a potential primary key column close to 100%. In this example, as shown in the matrix 402, C2 contains all the values of C3, C4 contains all the values of C1 and C5 contains all the values of C3. Each of these pairs could build a PK/FK candidate if the PK contains nearly only unique values and the cardinality of the FK exceeds a minimum threshold.

The same matrix can be used to compute the cross-domain overlapping between any column pairs. For instance, in the matrix 401 C1 and C2 have four values in common, which represent 40% of the values of C1 and 80% of the values of C2. In consequence, 60% of the values of C1 are not in C2 and 20% of the values of C2 are not in C1. Using embodiments of this invention, the similarity matrix 402 of all possible column pairs is only computed once and it can be used to answer any PK/FK analysis or cross-domain analysis query. Furthermore, this approach scales linearly with the number of physical nodes. Using the table number of physical nodes will reduce the execution time by two since many map/reduce jobs being executed are distributed among more nodes.

Data Quality Monitoring

One of the functions of data quality tools is to define rules that data should verify to be considered as good. These rules are evaluated regularly on a number of data records. The rows violating the rules are detected so that they can be cleansed or further analyzed in a second step. Data rules are typically a list of conditions that column values should fulfill. The rules can contain several tests connected with each other with Boolean operators. They can make use of function or arithmetic. Usually a large number of such rules need to be evaluated at the same time. Since these data rules are supposed to monitor the quality of production data, they need to run on all rules of the source tables and often cannot be run on smaller samples. That means that such a monitoring run may have to evaluate hundreds of rules on hundreds of tables. It is not unusual that such a monitoring run takes long time to finish. Also, often the number of rules must be reduced so that the analysis can run in the given time frame.

Figure 5:
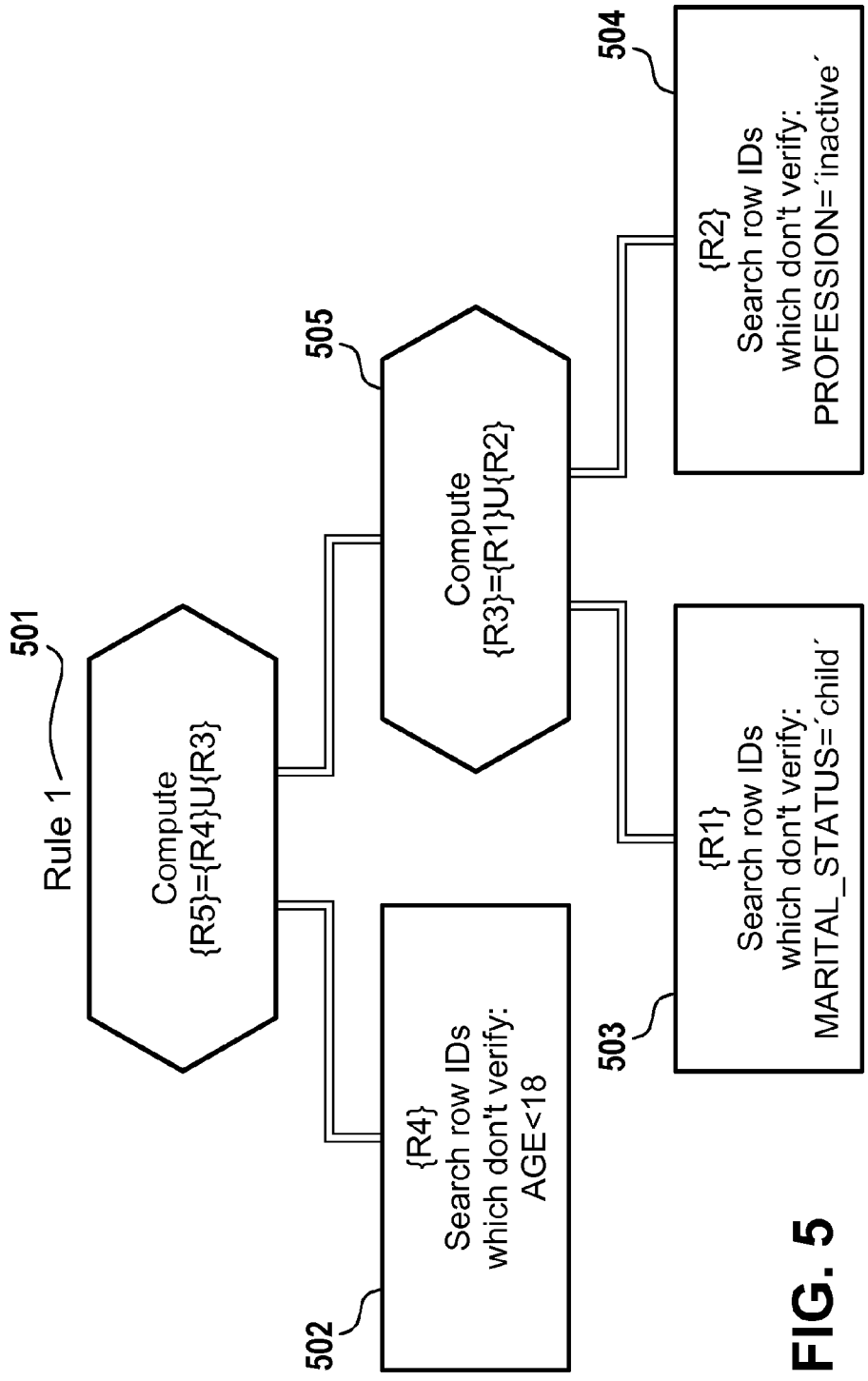
FIG. 5 shows an example of data quality rules evaluation.

An example of such a rule is shown in FIG. 5. The architecture introduced in this invention and the file format used to store the data allows efficient execution. Instead of evaluating all rules on a row-base, the individual task composing the rules individually on a column-base is evaluated. Tests that involve a single column can be directly evaluated by the physical node containing the column. Each test being evaluated on a column-base returns a list of row IDs of the rows passing or violating the test. The list of row IDs returned by each test are then combined with each other as unions or intersections to reflect the Boolean operators surrounding the test in the rule expressions.

The evaluation of the rule is therefore divided up in sub-evaluations. Each of the sub-evaluations is working on a single column on a different physical node. In order to obtain the list of row IDs violating the rule, combining the list of row IDs returned by each sub-evaluation. Each of these operations can be executed efficiently with a distributed file system combined with the column-based storage.

FIG. 5 shows how the evaluation of the rule 501 as an example would work. Rule 1 501 contains three independent tests 502, 503 and 504. These three tests are connected with each other with Boolean operators. Since each test in this example works on a single column, it can be directly evaluated by sub-jobs. For example, the evaluation of the test 'AGE<18' 502 will be sent to the node containing the column 'age'. The formula used to store the column makes the evaluation of this test faster than for a row-based approach. To get the list of the row IDs violating the test 502, there is only a need to return all the row IDs of all the distinct values placed in the file after the value 18. Next, getting the row IDs violating the test 505, which is a combination of the two tests, 'MARITAL STATUS=child' 503 and ' PROFESSION=inactive' 504 (i.e. 'MARITAL STATUS=child and PROFESSION=inactive'). This can be done by combining groups of row IDs violating the tests 503 and 504 as union of the lists returned by the two tests 503 and 504. Finally, the list of the rows violating the complete rule 501 is the list of row IDs returned by the evaluation of the test 502 'Age<18' union the list of row IDs returned by the evaluation of the test 505.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method of handling a data profiling request by using a distributed file system, wherein the distributed file system is a file system that is distributed among several physical nodes managed by a master node, wherein the master node distributes files using information from a metadata repository, wherein the metadata repository comprises metadata for the master node and the several physical nodes, and wherein the computer-implemented method comprises:

extracting, by a computer, tabular data from a data source of the distributed file system, wherein the tabular data is stored in a matrix structure of columns and rows containing data values;

splitting said tabular data by columns from said matrix structure, wherein each column is stored in a separate file, and wherein the columns are stored in multiple files;

storing the multiple files on a set of physical nodes of the distributed file system, wherein each file from the multiple files is stored at least once on two different physical nodes;

receiving a data profiling request from an application client, wherein the data profiling request indicates a profiling analysis type and data files to be profiled;

determining from the data profiling request which groups of files are requisite files that are required to be stored on a same physical node in order to perform the profiling analysis, wherein said determining is performed by a master node;

creating jobs by the master node, wherein each job created uses one of the requisite files that has been determined by the master node;

searching for physical nodes holding the requisite files for each job using information contained in the metadata repository;

determining a selected physical node to execute each job according to one of the two following cases:

in a first case in which all files required by a particular job are found in a first physical node and other physical nodes, wherein the first physical node is currently being utilized less than said other physical nodes, selecting the first physical node to execute the particular job;

in a second case in which all requisite files required by the particular job are not found on a single physical node, assimilating the requisite files into a second physical node, wherein the second physical node has been predetermined to have been utilized less than any other physical node; and executing the job in a selected physical node, wherein the selected physical node is from the first physical node and the second physical node.

2. The computer-implemented method of claim 1, wherein each of said rows is uniquely identified by a row identifier (ID).

3. The computer-implemented method of claim 1, further comprising:

automatically executing a self-destroy operation, by the master node, on a file that has reached a predetermined expiration date, wherein said self-destroy operation deletes the file.

4. The computer-implemented method of claim 1, wherein all jobs having a starting time during a predefined time window are accumulated for a global treatment by the master node.

5. The computer-implemented method of claim 1, wherein the selected physical node contains other system jobs in addition to a profiling job, and wherein the computer-implemented method further comprising:

measuring a resource utilization by a particular physical node;

in response to a measured resource utilization of the particular physical node exceeding a predetermined threshold, dynamically replicating files the particular physical node to a new physical node; and utilizing the new physical node to execute the profiling job.

6. The computer-implemented method of claim 5, wherein the resource utilization of the particular physical node is a CPU/IO load caused by concurrent jobs executing on the particular physical node.

7. The computer-implemented method of claim 1, further comprising:

compressing each column in the matrix structure by combining multiple rows from the matrix structure into a single row, wherein said single row contains a single cell that is populated with multiple row IDs, from the matrix structure, that identify a common data attribute.

8. The computer-implemented method of claim 1, further comprising:

in response to determining that a predetermined number of redundant files have been stored in both the second physical node and other physical nodes, deleting the redundant files from the other physical nodes.

9. The computer-implemented method of claim 1, wherein when all files required by a specific job are found on a first physical node, and wherein the computer-implemented method further comprises:

identifying a new physical node that is being utilized less than the first physical node; and duplicating all of the requisite files on the new physical node.

10. A computer program product for handling a data profiling request by using a distributed file system, wherein the distributed file system is a file system that is distributed among several physical nodes managed by a master node, wherein the master node distributes files using information from a metadata repository, wherein the metadata repository comprises metadata for the master node and the several physical nodes, wherein the computer program product comprises a non-transitory computer readable storage medium having program code embodied therewith, and wherein the program code is readable and executable by a processor to perform a method comprising:

extracting, by a computer, tabular data from a data source of the distributed file system, wherein the tabular data is stored in a matrix structure of columns and rows containing data values;

splitting said tabular data by columns from said matrix structure, wherein each column is stored in a separate file, and wherein the columns are stored in multiple files;

storing the multiple files on a set of physical nodes of the distributed file system, wherein each file from the multiple files is stored at least once on two different physical nodes;

receiving a data profiling request from an application client, wherein the data profiling request indicates a profiling analysis type and data files to be profiled;

determining from the data profiling request which groups of files are requisite files that are required to be stored on a same physical node in order to perform the profiling analysis, wherein said determining is performed by a master node;

creating jobs by the master node, wherein each job created uses one of the requisite files that has been determined by the master node;

searching for physical nodes holding the requisite files for each job using information contained in the metadata repository;

determining a selected physical node to execute each job according to one of the two following cases:

in a first case in which all files required by a particular job are found in a first physical node and other physical nodes, wherein the first physical node is currently being utilized less than said other physical nodes, selecting the first physical node to execute the particular job;

in a second case in which all requisite files required by the particular job are not found on a single physical node, assimilating the requisite files into a second physical node, wherein the second physical node has been predetermined to have been utilized less than any other physical node; and executing the job in a selected physical node, wherein the selected physical node is from the first physical node and the second physical node.

11. The computer program product of claim 10, wherein each of said rows is uniquely identified by a row identifier (ID).

12. The computer program product of claim 11, wherein the method performed by the processor executing the program code further comprises:
   automatically executing a self-destroy operation, by the master node, on a file that has reached a predetermined expiration date, wherein said self-destroy operation deletes the file.

13. The computer program product of claim 11, wherein all jobs having a starting time during a predefined time window are accumulated for a global treatment by the master node.

14. The computer program product of claim 11, wherein the selected physical node contains other system jobs in addition to a profiling job, and wherein the method performed by the processor executing the program code further comprises:
   measuring a resource utilization by a particular physical node;
   in response to a measured resource utilization of the particular physical node exceeding a predetermined threshold, dynamically replicating files the particular physical node to a new physical node; and
   utilizing the new physical node to execute the profiling job.

15. The computer program product of claim 14, wherein the resource utilization of the particular physical node is a CPU/IO load caused by concurrent jobs executing on the particular physical node.

16. The computer program product of claim 11, wherein the method performed by the processor executing the program code further comprises:
   compressing each column in the matrix structure by combining multiple rows from the matrix structure into a single row, wherein said single row contains a single cell that is populated with multiple row IDs, from the matrix structure, that identify a common data attribute.

17. The computer program product of claim 11, wherein the method performed by the processor executing the program code further comprises:
   in response to determining that a predetermined number of redundant files have been stored in both the second physical node and other physical nodes, deleting the redundant files from the other physical nodes.

18. The computer program product of claim 11, wherein when all files required by a specific job are found on a first physical node, and wherein the method performed by the processor executing the program code further comprises:
   identifying a new physical node that is being utilized less than the first physical node; and
   duplicating all of the requisite files on the new physical node.

19. A computer system comprising:
   a processor, a computer readable memory, and a non-transitory computer readable storage medium;
   first program instructions to extract tabular data from a data source of the distributed file system, wherein the tabular data is stored in a matrix structure of columns and rows containing data values;
   second program instructions to split said tabular data by columns from said matrix structure, wherein each column is stored in a separate file, and wherein the columns are stored in multiple files;
   third program instructions to store the multiple files on a set of physical nodes of the distributed file system, wherein each file from the multiple files is stored at least once on two different physical nodes;
   fourth program instructions to receive a data profiling request from an application client, wherein the data profiling request indicates a profiling analysis type and data files to be profiled;
   fifth program instructions to determine from the data profiling request which groups of files are requisite files that are required to be stored on a same physical node in order to perform the profiling analysis, wherein said determining is performed by a master node;
   sixth program instructions to create jobs by the master node, wherein each job created uses one of the requisite files that has been determined by the master node;
   seventh program instructions to search for physical nodes holding the requisite files for each job using information contained in the metadata repository;
   eighth program instructions to determine a selected physical node to execute each job according to one of the two following cases:
      in a first case in which all files required by a particular job are found in a first physical node and other physical nodes, wherein the first physical node is currently being utilized less than said other physical nodes, selecting the first physical node to execute the particular job;
      in a second case in which all requisite files required by the particular job are not found on a single physical node, assimilating the requisite files into a second physical node, wherein the second physical node has been predetermined to have been utilized less than any other physical node; and
   ninth program instructions to execute the job in a selected physical node, wherein the selected physical node is from the first physical node and the second physical node; and wherein the first, second, third, fourth, fifth, sixth, seventh, eighth, and ninth program instructions are stored on the non-transitory computer readable storage medium for execution by the processor via the computer readable memory.

20. The computer system of claim 19, wherein all jobs having a starting time during a predefined time window are accumulated for a global treatment by the master node.

* * * * *